United States Patent
Tong et al.

(10) Patent No.: US 10,270,721 B2
(45) Date of Patent: Apr. 23, 2019

(54) METHOD AND APPARATUS FOR UPLOADING AN ATTACHMENT

(71) Applicant: TENCENT TECHNOLOGY (SHENZHEN) COMPANY LIMITED, Shenzhen (CN)

(72) Inventors: Miao Tong, Shenzhen (CN); Dengxue Cui, Shenzhen (CN); Wenjie Fang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 363 days.

(21) Appl. No.: 14/723,960

(22) Filed: May 28, 2015

(65) Prior Publication Data

US 2015/0263998 A1   Sep. 17, 2015

Related U.S. Application Data

(63) Continuation of application No. PCT/CN2013/088131, filed on Nov. 29, 2013.

(30) Foreign Application Priority Data

Nov. 29, 2012 (CN) .......................... 2012 1 0499226

(51) Int. Cl.
*G06F 16/16* (2019.01)
*G06Q 10/10* (2012.01)
(Continued)

(52) U.S. Cl.
CPC .......... *H04L 51/08* (2013.01); *G06F 3/0482* (2013.01); *G06F 3/04842* (2013.01);
(Continued)

(58) Field of Classification Search
CPC ........... G06F 3/04817; G06F 3/04886; G06F 3/0486; G06F 16/168; G06F 3/0482;
(Continued)

(56) References Cited

U.S. PATENT DOCUMENTS

| | | | |
|---|---|---|---|
| 5,953,532 A * | 9/1999 | Lochbaum | G06F 3/0486 |
| | | | 705/500 |
| 6,167,469 A * | 12/2000 | Safai | H04N 1/00209 |
| | | | 348/157 |

(Continued)

FOREIGN PATENT DOCUMENTS

| | | |
|---|---|---|
| CN | 1940919 A | 4/2007 |
| CN | 101599017 A | 12/2009 |

(Continued)

OTHER PUBLICATIONS

Chinese Office Action dated Apr. 5, 2017 in Chinese Patent Application No. 201210499226.1.

(Continued)

*Primary Examiner* — Andrew L Tank
(74) *Attorney, Agent, or Firm* — Knobbe Martens Olson & Bear LLP

(57) ABSTRACT

The examples of the present disclosure disclose a method and apparatus for uploading an attachment, relate to the internet technologies, and solve problems in the traditional art that a user device cannot completely show all the content to upload and that some touch screen devices cannot obtain information inputted by the user properly. The method comprises: uploading an attachment uploading interface, the attachment uploading interface including at least one attachment uploading option; determining an attachment to upload when an attachment uploading option is activated; and generating attachment information corresponding to the attachment to upload and displaying the attachment information on a location where the at least one attachment uploading option is displayed.

10 Claims, 5 Drawing Sheets

(51) Int. Cl.
*G06F 3/0482* (2013.01)
*H04L 12/58* (2006.01)
*G06F 16/44* (2019.01)
*G06Q 50/00* (2012.01)
*G06F 3/0484* (2013.01)

(52) U.S. Cl.
CPC ............ *G06F 16/168* (2019.01); *G06F 16/44* (2019.01); *G06Q 10/107* (2013.01); *G06Q 50/01* (2013.01); *H04L 51/046* (2013.01); *H04L 51/10* (2013.01)

(58) Field of Classification Search
CPC .. G06F 3/04842; G06Q 10/107; G06Q 50/01; H04L 51/08; H04L 51/10; H04L 51/046; H04M 1/72552; H04W 4/12
USPC .......................... 715/733, 752, 838; 707/822
See application file for complete search history.

(56) References Cited

U.S. PATENT DOCUMENTS

| | | | | |
|---|---|---|---|---|
| 7,882,185 | B2* | 2/2011 | Nagarajan | G06Q 30/02 709/200 |
| 8,286,085 | B1* | 10/2012 | Denise | G06Q 10/107 707/705 |
| 8,806,364 | B2* | 8/2014 | Hwang | G06F 3/0488 715/788 |
| 9,519,888 | B2* | 12/2016 | Gadwale | H04L 51/00 |
| 9,727,376 | B1* | 8/2017 | Bills | G06F 9/4881 |
| 2003/0193601 | A1* | 10/2003 | Kobayashi | G06F 3/04817 348/333.01 |
| 2004/0068545 | A1* | 4/2004 | Daniell | H04L 51/00 709/206 |
| 2004/0098414 | A1* | 5/2004 | Chan | H04L 67/06 |
| 2004/0100497 | A1* | 5/2004 | Quillen | H04L 67/36 715/751 |
| 2007/0035764 | A1* | 2/2007 | Aldrich | G06F 17/3028 358/1.15 |
| 2007/0220425 | A1* | 9/2007 | Matulic | G06F 17/24 715/234 |
| 2007/0271344 | A1* | 11/2007 | Danasekaran | G06Q 10/10 709/206 |
| 2008/0034117 | A1* | 2/2008 | Lemay | G06F 17/248 709/245 |
| 2008/0172663 | A1* | 7/2008 | Lee | H04L 51/38 717/173 |
| 2009/0112999 | A1* | 4/2009 | Nicholas | G06Q 10/107 709/206 |
| 2010/0248788 | A1* | 9/2010 | Yook | G06F 3/0481 455/566 |
| 2010/0295802 | A1* | 11/2010 | Lee | G06F 1/1626 345/173 |
| 2011/0080356 | A1* | 4/2011 | Kang | G06F 3/0486 345/173 |
| 2011/0283212 | A1* | 11/2011 | Warner | G06F 3/0486 715/769 |
| 2011/0314384 | A1* | 12/2011 | Lindgren | G06Q 10/107 715/739 |
| 2012/0072856 | A1* | 3/2012 | Park | H04L 51/043 715/752 |
| 2012/0079069 | A1 | 3/2012 | Tian | |
| 2013/0040611 | A1* | 2/2013 | Rega | H04M 1/72566 455/413 |
| 2013/0067027 | A1* | 3/2013 | Song | H04W 4/21 709/217 |
| 2013/0138744 | A1* | 5/2013 | Rajamanthiram | H04L 51/08 709/206 |
| 2014/0325451 | A1 | 10/2014 | Wang et al. | |
| 2015/0134751 | A1* | 5/2015 | Meyers, Jr. | H04L 51/08 709/206 |

FOREIGN PATENT DOCUMENTS

| | | |
|---|---|---|
| CN | 102508864 A | 6/2012 |
| CN | 103207725 A | 7/2013 |

OTHER PUBLICATIONS

International Search Report for International Application No. PCT/CN2013/088131, dated Mar. 20, 2014.
Office Action Issued in Chinese Patent Application No. 201210499226.1 dated Aug. 26, 2016, in 7 pages.
International Preliminary Report on Patentability Issued for International Application No. PCT/CN2013/088131 dated Jun. 2, 2015, in 6 pages.

* cited by examiner

New Broadcast

| Text Input Area | Upload From Local |
| | Upload Captured Photo |

Publish  Cancel

Fig. 3(a)

New Broadcast

| Text Input Area | Attachment Information |

Publish  Cancel

Fig. 3(b)

METHOD AND APPARATUS FOR UPLOADING AN ATTACHMENT

CROSS REFERENCE TO RELATED APPLICATIONS

This application is a continuation application of PCT Patent Application No. PCT/CN2013/088131, entitled "Method and Apparatus for Uploading an Attachment" filed on Nov. 29 2013, which claims priority to Chinese Patent Application No. 201210499226.1, entitled "Method and Apparatus for Uploading an Attachment" filed on Nov. 29, 2012, both of which are incorporated by reference in their entirety.

TECHNICAL FIELD

The present disclosure relates to internet technologies, and particularly relates to a method and apparatus for uploading an attachment.

BACKGROUND

With wide use of the internet, social network services (SNSs) develop rapidly. A SNS provides an interaction platform for internet users to communicate with each other and make friends with each other. A user can upload information such as text, images, and so on to show himself or share funny things with other users. Since multimedia materials such as images or video files have a relatively direct visual appearance, uploading images to the SNS network gradually becomes a main tendency of the SNS developments.

FIG. 1 shows an operation interface via which a user device can upload text, images and so on. As shown in FIG. 1, text to upload is inputted into a text input area on the operation interface; when an upload from local button on the operation interface is clicked, a local image media library is invoked for the user to select and determine an image to upload, and the image to upload is loaded and displayed in the text input area; or when an upload captured photo button is clicked, a camera of the user device is invoked to take a picture, and after the picture is taken, the taken picture is loaded and displayed in the text input area.

During implementation of the present disclosure, the inventor finds that following problems may exist in the traditional art:

Since the space of a user device's screen is limited, when a user inputs a relatively large amount of text information or when the size of an image to upload is too large, the user device can't display all the content to upload completely; or for some touch screen devices, when an image to upload is too large, the image may cover the touch screen keyboard area, resulting in that the touch screen devices can't obtain information inputted by the user properly.

SUMMARY

The examples of the present disclosure provide a method and device for uploading an attachment to solve the problems that a user device can't completely display all the content to upload and that some touch screen devices can't obtain information inputted by the user properly.

An aspect of the present disclosure provides an apparatus for uploading an attachment, including: a loading unit, to load an attachment uploading interface, the attachment uploading interface including at least one attachment uploading option; a determination unit, to determine an attachment to upload when an attachment uploading option is activated; and a display unit, to generate attachment information corresponding to the attachment to upload and display the attachment information on a location where the at least one attachment uploading option is displayed.

Another aspect of the present disclosure provides a method for uploading an attachment, including: loading an attachment uploading interface, the attachment uploading interface including at least one attachment uploading option; determining an attachment to upload when an attachment uploading option is activated; and generating attachment information corresponding to the attachment to upload and displaying the attachment information on a location where the at least one attachment uploading option is displayed.

Another aspect of the present disclosure provides an apparatus for uploading an attachment, including: memory; one or more processors; and one or more programs stored in the memory and configured for execution by the one or more processors, the one or more programs including instructions to: load an attachment uploading interface, the attachment uploading interface containing at least one attachment uploading option; determine an attachment to upload when an attachment uploading option is activated; generate attachment information corresponding to the attachment to upload; and display the attachment information on a location where the at least one attachment uploading option is displayed.

A further aspect of the present disclosure provides a non-transitory computer-readable storage medium comprising a set of instructions for rating reputation of a web site, the set of instructions to direct at least one processor to perform acts of: loading an attachment uploading interface, the attachment uploading interface containing at least one attachment uploading option; determining an attachment to upload when an attachment uploading option is activated; generating attachment information corresponding to the attachment to upload; and displaying the attachment information on a location where the at least one attachment uploading option is displayed.

Compared to what in the traditional art that attachment information corresponding to an attachment to upload is generally displayed on an area of a text input area or of a touch screen keyboard area, which affects normal use of the text input area or the touch screen keyboard area, for the method and apparatus for uploading an attachment provided by the present disclosure, since the attachment information corresponding to the attachment to upload is displayed on the location where the at least one attachment uploading option is displayed, therefore the attachment information of the present disclosure is prevented from being displayed on the area of the text input area or of the touch screen keyboard area, thus solving the problem in the traditional art that a user device can't completely display all the content to upload, and that some touch screen devices can't obtain information inputted by the user properly.

BRIEF DESCRIPTION OF THE DRAWINGS

For a better understanding of the present disclosure, reference should be made to the Detailed Description below, in conjunction with the following drawings in which like reference numerals refer to corresponding parts throughout the figures.

FIG. 3(a) shows a schematic diagram of an attachment uploading interface provided by an example of the present disclosure;

FIG. 3(b) shows another schematic diagram of the attachment uploading interface provided by the example of the present disclosure;

DETAILED DESCRIPTION

Reference will now be made in detail to examples, which are illustrated in the accompanying drawings. In the following detailed description, numerous specific details are set forth in order to provide a thorough understanding of the present disclosure. Also, the figures are illustrations of an example, in which modules or procedures shown in the figures are not necessarily essential for implementing the present disclosure. In other instances, well-known methods, procedures, components, and circuits have not been described in detail so as not to unnecessarily obscure aspects of the examples.

Figure 1:
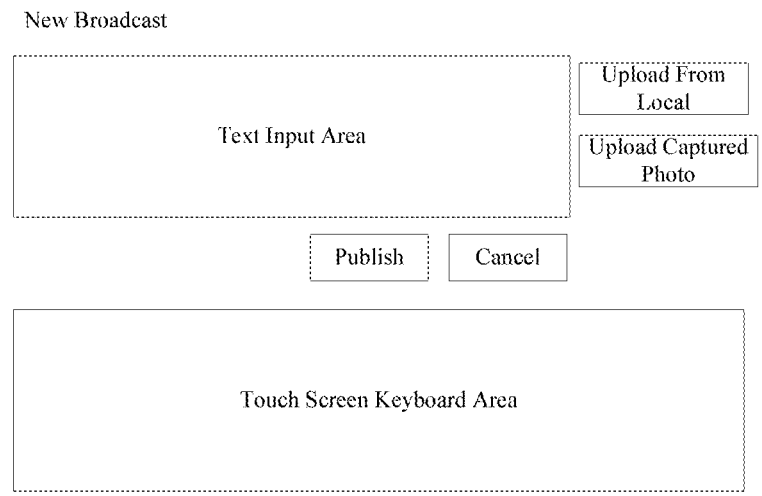
FIG. 1 shows a schematic diagram of an attachment uploading interface of the traditional art.
Figure 2:
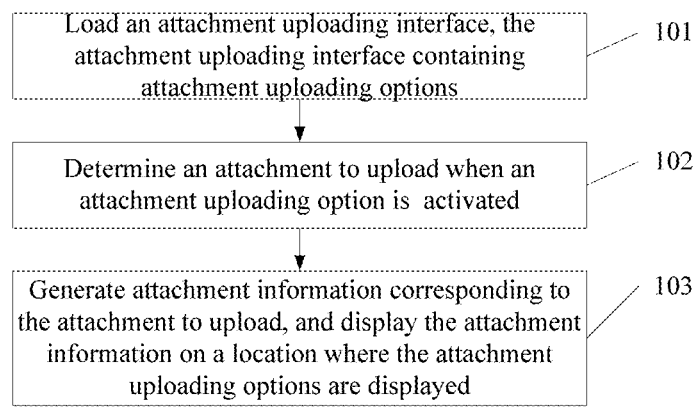
FIG. 2 shows a flowchart of a method for uploading an attachment provided by an example of the present disclosure.

FIG. 2 shows a flowchart of a method for uploading an attachment provided by an example of the present disclosure.

As shown in FIG. 2, at block 101, an attachment uploading interface is loaded and the attachment uploading interface includes attachment uploading options. Specifically, the attachment uploading options may be an upload from local option and/or may be an attachment obtaining option. An attachment to upload can be an image file, an audio file, a video file, and so on. However, it is not limited to these.

For example, if the attachment to upload is an image file, an interface to display the image to upload is shown in FIG. 3(a), where the attachment uploading options include an upload from local option and an upload captured photo option.

At block 102, when an attachment uploading option is activated, an attachment to upload is determined.

For example, if the upload from local option is activated, a local file selection interface will be displayed and the user can select a file from the local file selection interface. The selected local file will be deemed as the attachment to upload.

As another example, if the above attachment to upload is an image, after the attachment obtaining option is activated, a camera of the electronic device is started, and after the camera captures an image, the image captured by the camera will be used as the attachment to upload.

Optionally, the local file selection interface can be displayed, and a selected local file is determined as the attachment to upload. For example, after the upload from local option is activated, a local image file stored on the electronic device will be selected to upload. The attachment to upload can be various kinds of forms, e.g., an audio file, a video file, etc., but is not limited to these.

Optionally, an attachment obtaining program is started and a file is obtained by the attachment obtaining program. The file obtained by the attachment obtaining program is determined as the attachment to upload. The attachment obtaining program can be e.g. starting the above camera, and an image file can be obtained by the camera. Furthermore, the above attachment obtaining program can be starting a video camera, a recorder, etc., but it is not limited to these.

At block 103, attachment information corresponding to the attachment to upload is generated, and the attachment information is displayed on a location where the attachment uploading options are displayed. For example, as shown in FIG. 3(b), the attachment information of the image is shown on a location where the upload from local option and the upload captured photo option are displayed.

Compared to what in the traditional art that attachment information corresponding to an attachment to upload is generally displayed on an area of a text input area or a touch screen keyboard area, which affects normal use of the text input area or the touch screen keyboard area, for the method for uploading an attachment provided by the example of the present disclosure, since the attachment information corresponding to the attachment to upload is displayed on the location where the attachment uploading options are displayed, therefore, the attachment information of the present disclosure is prevented from being displayed on the area of the text input area or the touch screen keyboard area, thus solving the problem in the traditional art that a user device can't completely show all the content to upload, and that some touch screen devices can't obtain information inputted by the user properly.

Figure 4:
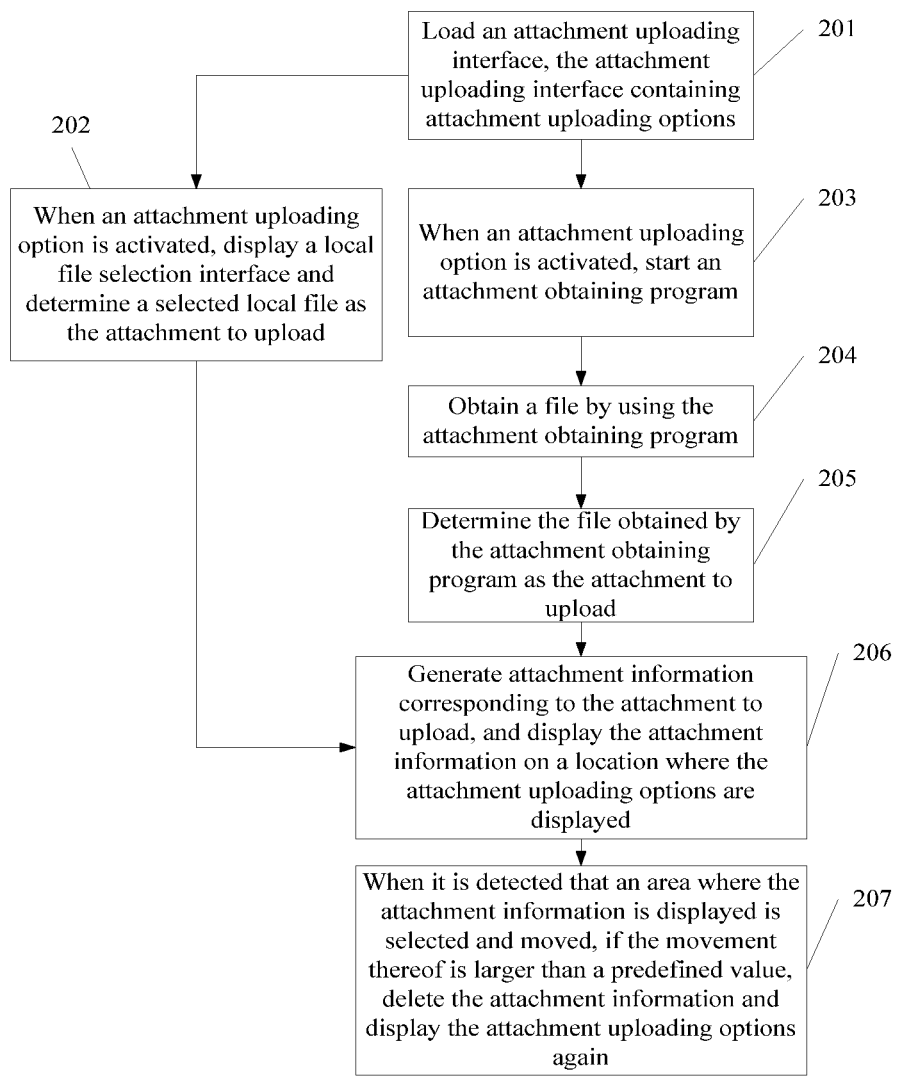
FIG. 4 shows a flow chart of a method for uploading an attachment provided by another example of the present disclosure.

FIG. 4 shows a flow chart of a method for uploading an attachment according to another example of the present disclosure.

As shown in FIG. 4, at block 201, an attachment uploading interface is loaded, the attachment uploading interface including attachment uploading options. And then, block 202 or 203 is executed. Specifically, the attachment uploading options may be an upload from local option or may be an attachment obtaining option. An attachment to upload can be an image file, an audio file, a video file, and so on. However, it should not be limited to these.

For example, if the attachment to upload is an image file, then an interface to display the image to upload is shown in FIG. 3(a), where the attachment uploading options include an upload from local option and an upload captured photo option.

At block 202, when an attachment uploading option is activated, a local file selection interface is shown, and a selected local file is determined as the attachment to upload. Then block 206 is executed.

Specifically, here the attachment uploading option can be an upload from local option. And after the upload from local option is activated, the local file selection interface is displayed, and the selected local file is determined as the attachment to upload.

For example, when the attachment to upload is an image file, after the upload from local option is clicked, a local image media library selection interface is displayed, and after the user selects an image from the image media library, the image selected by the user is used as the attachment to upload.

At block 203, when the attachment uploading option is activated, an attachment obtaining program is started. Specifically, here the attachment uploading option is an attachment obtaining option. For example, when the attachment to upload is an image file, after the attachment obtaining option is activated, the camera of the electronic device is started, and after the camera captures an image, the image captured by the camera will be used as the attachment to upload.

At block 204, a file is obtained by the attachment obtaining program. Specifically, the camera of the electronic device can be used to obtain an image file, or the video camera of the electronic device can be used to obtain a video file, or a recorder of the electronic device can be used to obtain an audio file, and so on, and the present disclosure should not be limited to these.

At block 205, the image obtained by the attachment obtaining program is determined as the attachment to upload. And then the block 206 is executed.

At block 206, attachment information corresponding to the attachment to upload is generated, and the attachment information is displayed on a location where the attachment uploading options are displayed.

If the attachment is an image file, the attachment information contains an image name, an image format, and/or an image thumbnail. Or if the attachment is an audio file, the attachment information contains an audio name, an audio format, and/or audio play time. Or if the attachment is a video file, the attachment information contains a video name, a video format, a video thumbnail, and/or video play time.

Specifically, the size of the area where the attachment information is displayed can be configured, and the attachment information can be displayed on a location where the attachment uploading options are displayed, in which the size of the display area of the attachment information is larger, smaller or equal to the size of the location where the attachment uploading options are displayed.

For example, when the attachment information needs to be displayed more comprehensively, the size of the area where the attachment information is displayed will increase accordingly as needs.

To be specific, when a thumbnail contained in the attachment information is to be shown, it can be shown by being slidden in an animated way from an edge of the electronic device screen to the location where the attachment uploading options are displayed. Specifically, the obtained thumbnail of the attachment to upload is shown in an Image Control, and the X coordinate property, TranslateX, and the Y coordinate property, TranslateY, of the Image Control are changed by using an animation function DoubleAnimation (an animation function used to realize smooth movements of Controls). Horizontal changes of the Image Control can be realized by changing a value of the X coordinate property thereof, TranslateX, and in a same way, vertical changes of the Image Control can be realized by changing a value of the Y coordinate property thereof, TranslateY. In this way, the Image Control can be slid from the edge of the screen to the location where the attachment uploading options are displayed.

At block 207, when it is detected that the area where the attachment information is displayed is selected and moved, if the movement thereof is larger than a predefined value, then the attachment information is deleted and the attachment uploading options are shown again.

Specifically, an animation function DoubleAnimation is used to change the X coordinate property, TranslateX, and the Y coordinate property, TranslateY, to slide the Image Control from the location where the attachment uploading options are displayed to the edge of the screen so as to form a deletion animation.

Compared to what in the traditional art that attachment information corresponding to an attachment to upload is generally displayed on an area of a text input area or of a touch screen keyboard area, which affects normal use of the text input area or the touch screen keyboard area, for the method for uploading an attachment provided by another example of the present disclosure, since the attachment information corresponding to the attachment to upload is displayed on the location where the attachment uploading options are displayed, therefore the attachment information of the present disclosure is prevented from being displayed on the area of the text input area or of the touch screen keyboard area, thus solving the problem in the traditional art that some user devices can't completely show all the content to upload, and that some touch screen devices can't obtain information inputted by the user properly.

Figure 5:
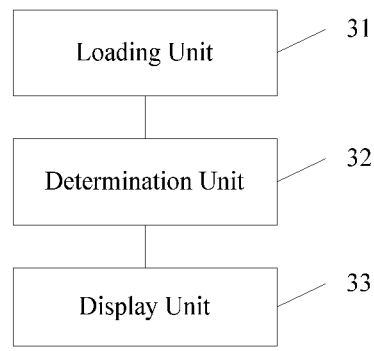
FIG. 5 shows a schematic diagram of a structure of an apparatus for uploading an attachment provided by an example of the present disclosure.

FIG. 5 shows a schematic diagram of a structure of an apparatus for uploading an attachment provided by an example of the present disclosure. As shown in FIG. 5, the apparatus for uploading an attachment provided by an example of the present disclosure includes: an uploading unit 31, a determination unit 32, and a display unit 33.

The uploading unit 31 is adapted to load an attachment uploading interface, the attachment uploading interface including the attachment uploading options. For detailed implementation thereof, please refer to what shown in the block 101 of FIG. 2, which will not be elaborated herein.

The determination unit 32 is adapted to determine an attachment to upload when an attachment uploading option is activated. For detailed implementation thereof, please refer to what shown in the block 102 of FIG. 2, which will not be elaborated herein.

The display unit 33 is adapted to generate attachment information corresponding to the attachment to upload and display the attachment information on the location where the attachment uploading options are displayed. For detailed implementation thereof, please refer to what shown in the block 103 of FIG. 2, which will not be elaborated herein.

Figure 6:
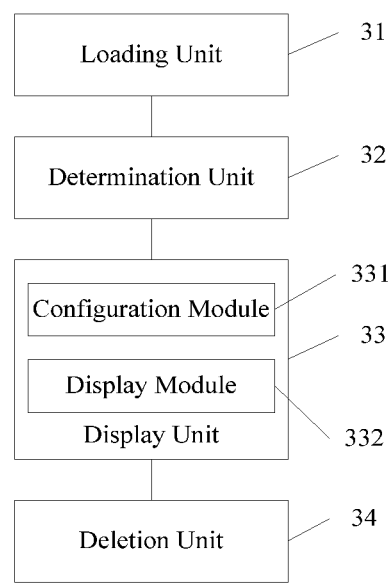
FIG. 6 shows a schematic diagram of a structure of an apparatus for uploading an attachment provided by another example of the present disclosure.

To be specific, as shown in FIG. 6, the determination unit 32 is adapted to, when the attachment uploading option is activated, display a local file selection interface, and determine a selected local file as the attachment to upload. For detailed implementation thereof, please refer to what shown in the block 202 of FIG. 4, which will not be elaborated herein.

Specifically, as shown in FIG. 6, the determination unit 32 is specifically adapted to, when the attachment uploading option is activated, start an attachment obtaining program. For detailed implementation thereof, please refer to the content shown in the block 203 of FIG. 4, which will not be elaborated herein.

A file obtained by the attachment obtaining program is determined as the attachment to upload. For detailed implementation thereof, please refer to what shown in the block 205 of FIG. 4, which will not be elaborated herein.

Specifically, as shown in FIG. 6, the apparatus further includes a deletion unit 34. And the deletion unit 34 is adapted to, when it is detected that the display area of the attachment information is selected and moved, if the movement thereof is larger than the predefined value, the attachment information is deleted and the attachment uploading options will be shown again. For detailed implementation thereof, please refer to what shown in block 207 of FIG. 4, which will not be elaborated herein.

Further, FIG. 6 shows a schematic diagram of a structure of an apparatus for uploading an attachment provided by another example of the present disclosure. As shown in FIG. 6, the display unit 33 includes a configuration module 331 and a display module 332.

The configuration module 331 is adapted to configure the size of the area where the attachment information is displayed. And the display module 332 is adapted to display the attachment information on the location where the attachment uploading options are displayed. The size of the area where the attachment information is displayed is larger, smaller or equal to the size of the location where the attachment uploading options are displayed.

Compared to what in the traditional art that attachment information corresponding to an attachment to upload is generally displayed on an area of a text input area or a touch screen keyboard area, which affects normal use of the text input area or the touch screen keyboard area, for the apparatus for uploading an attachment provided by the present disclosure, since the attachment information corresponding to the attachment to upload is displayed on the location where the attachment uploading options are displayed, therefore, the attachment information of the present disclosure is prevented from being displayed on the area of the text input area or of the touch screen keyboard area, thus solving the problem in the traditional art that a user device can't completely display all the content to upload, and that some touch screen devices can't obtain information inputted by the user properly.

Figure 7:
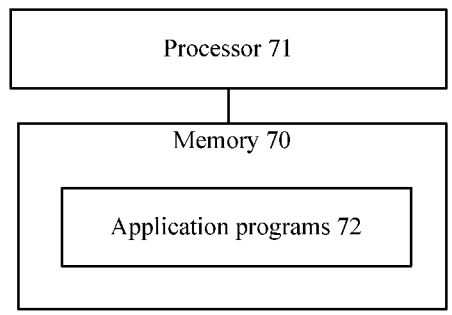
FIG. 7 shows a block diagram illustrating an apparatus for loading an attachment according to an example of the present disclosure.

FIG. 7 shows a block diagram illustrating an apparatus for loading an attachment according to an example of the present disclosure. The apparatus includes a memory 70, one or more processors 71, and one or more programs 72 stored in the memory and configured for execution by the one or more processors 71. The one or more programs 72 include instructions to execute the operations of blocks 101 to 103. And specifically, the instructions are used to execute the operations of blocks 201 to 207.

An example of the present disclosure also discloses a non-transitory computer-readable storage medium including a set of instructions for loading an attachment. The set of instructions are used to direct at least one processor to perform acts in the blocks 101 to 103. And specifically, the instructions are used to direct the at least one processor to perform acts in the blocks 201 to 207.

The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the principles of the present disclosure and its practical applications, to thereby enable others skilled in the art to best utilize the present disclosure and various examples with various modifications as are suited to the particular use contemplated.

The above examples may be implemented by hardware, software, firmware, or a combination thereof. For example the various methods, processes and functional modules described herein may be implemented by a processor (the term processor is to be interpreted broadly to include a CPU, processing unit/module, ASIC, logic module, or programmable gate array, etc.). The processes, methods and functional modules may all be performed by a single processor or split between several processors; reference in this disclosure or the claims to a 'processor' should thus be interpreted to mean 'one or more processors'. The processes, methods and functional modules are implemented as machine readable instructions executable by one or more processors, hardware logic circuitry of the one or more processors or a combination thereof. The modules, if mentioned in the aforesaid examples, may be combined into one module or further divided into a plurality of sub-modules. Further, the examples disclosed herein may be implemented in the form of a software product. The computer software product is stored in a non-transitory storage medium and comprises a plurality of instructions for making an electronic device implement the method recited in the examples of the present disclosure.

What is claimed is:

1. A method for uploading an attachment, comprising:
   loading an attachment uploading interface on a social network, the attachment uploading interface containing at least one of a local attachment uploading button or a captured attachment uploading button, a text input box, and a publishing button;
   in response to determining that the local attachment uploading button is triggered, displaying a local file selection interface for selecting a local file from a local file library, and in response to determining that the local file is selected from the local file library, determining the selected local file as a first attachment attached to text inputted into the text input box,
   generating attachment information from the first attachment, and displaying the attachment information generated from the first attachment on a location where the local attachment uploading button is displayed
   in response to determining that the captured attachment uploading button is triggered, obtaining a captured file, determining the obtained captured file as a second attachment attached to the text inputted into the text input box, generating attachment information from the second attachment, and displaying the attachment information generated from the second attachment on a location where the captured attachment uploading button is displayed; and
   in response to determining that the publishing button is triggered, publishing at least one of the first attachment or the second attachment together with the text inputted into the text input box on the social network.

2. The method according to claim 1, wherein
   at least one of the first attachment or the second attachment is an image and at least one of the attachment information generated from the first attachment or the attachment information generated from the second attachment includes an image name, an image format, and an image thumbnail; or
   at least one of the first attachment or the second attachment is an audio file and at least one of the attachment information generated from the first attachment or the attachment information generated from the second attachment includes an audio name, an audio format, and an audio play time; or
   at least one of the first attachment or the second attachment is a video file and at least one of the attachment information generated from the first attachment or the attachment information generated from the second attachment includes a video name, a video format, a video thumbnail, and a video play time.

3. The method according to claim 2, wherein
   a size of an area where the attachment information generated from the first attachment is displayed is larger than, smaller than or equal to a size of the location where the local attachment uploading button is displayed, and a size of an area where the attachment information generated from the second attachment is displayed is larger than, smaller than or equal to a size of the location where the captured attachment uploading button is displayed.

4. The method according to claim 1, wherein the method further comprises:
    detecting that an area where the attachment information generated from the first attachment is displayed is selected and that the attachment information generated from the first attachment is moved, and in response to determining that the movement of the attachment information generated from the first attachment is larger than a predefined value, deleting the attachment information generated from the first attachment and displaying the local attachment uploading button again; and
    detecting that an area where the attachment information generated from the second attachment is displayed is selected and that the attachment information generated from the second attachment is moved, and in response to determining that the movement of the attachment information generated from the second attachment is larger than a predefined value, deleting the attachment information generated from the second attachment and displaying the captured attachment uploading button again.

5. An apparatus for uploading an attachment, comprising:
    memory;
    one or more processors; and
    one or more programs stored in the memory and configured for execution by the one or more processors, the one or more programs comprising instructions to:
    load an attachment uploading interface on a social network, the attachment uploading interface containing at least one of a local attachment uploading button or a captured attachment uploading button, a text input box, and a publishing button;
    in response to determining that the local attachment uploading button is triggered, display a local file selection interface for selecting a local file from a local file library, and in response to determining that the local file is selected from the local file library, determine the selected local file as a first attachment attached to text inputted into the text input box,
    generate attachment information from the first attachment, and
    display the attachment information generated from the first attachment on a location where the local attachment uploading button is displayed;
    in response to determining that the captured attachment uploading button is triggered, obtain a captured file, determine the obtained captured file as a second attachment attached to the text inputted into the text input box, generate attachment information from the second attachment, and display the attachment information generated from the second attachment on a location where the captured attachment uploading button is displayed; and
    in response to determining that the publishing button is triggered, publish at least one of the first attachment or the second attachment together with the text inputted into the text input box on the social network.

6. The apparatus according to claim 5, wherein
    at least one of the first attachment or the second attachment is an image and at least one of the attachment information generated from the first attachment or the attachment information generated from the second attachment includes an image name, an image format, and an image thumbnail; or
    at least one of the first attachment or the second attachment is an audio file and at least one of the attachment information generated from the first attachment or the attachment information generated from the second attachment includes an audio name, an audio format, and an audio play time; or
    at least one of the first attachment or the second attachment is a video file and at least one of the attachment information generated from the first attachment or the attachment information generated from the second attachment includes a video name, a video format, a video thumbnail, and a video play time.

7. The apparatus according to claim 6, wherein
    a size of an area where the attachment information generated from the first attachment is displayed is larger than, smaller than or equal to a size of the location where the local attachment uploading button is displayed, and a size of an area where the attachment information generated from the second attachment is displayed is larger than, smaller than or equal to a size of the location where the captured attachment uploading button is displayed.

8. The apparatus according to claim 5, wherein the one or more programs further comprises instructions to:
    detect that an area where the attachment information generated from the first attachment is displayed is selected and that the attachment information generated from the first attachment is moved, and in response to determining that the movement of the attachment information generated from the first attachment is larger than a predefined value, delete the attachment information generated from the first attachment and display the local attachment uploading button again; and
    detect that an area where the attachment information generated from the second attachment is displayed is selected and that the attachment information generated from the second attachment is moved, and in response to determining that the movement of the attachment information generated from the second attachment is larger than a predefined value, delete the attachment information generated from the second attachment and display the captured attachment uploading button again.

9. A non-transitory computer-readable storage medium comprising a set of instructions for rating reputation of a web site, the set of instructions to direct at least one processor to perform acts of:
    loading an attachment uploading interface on a social network, the attachment uploading interface containing at least one of a local attachment uploading button or a captured attachment uploading button, a text input box, and a publishing button;
    in response to determining that the local attachment uploading button is triggered, displaying a local file selection interface for selecting a local file from a local file library, and in response to determining that the local file is selected from the local file library, determining the selected local file as a first attachment attached to text inputted into the text input box,
    generating attachment information from the first attachment, and
    displaying the attachment information generated from the first attachment on a location where the local attachment uploading button is displayed;
    in response to determining that the captured attachment uploading button is triggered, obtaining a captured file, determining the obtained captured file as a second attachment attached to the text inputted into the text input box, generating attachment information from the second attachment, and displaying the attachment information generated from the second attachment on a location where the captured attachment uploading button is displayed; and in response to determining that the publishing button is triggered, publishing at least one of the first attachment or the second attachment together with the text inputted into the text input box on the social network.

10. The non-transitory computer-readable storage medium according to claim 9, wherein, the set of instructions further direct the at least one processor to perform acts of:

detecting that an area where the attachment information generated from the first attachment is displayed is selected and that the attachment information generated from the first attachment is moved, and in response to determining that the movement of the attachment information generated from the first attachment is larger than a predefined value, deleting the attachment information generated from the first attachment and displaying the local attachment uploading button again; and detecting that an area where the attachment information generated from the second attachment is displayed is selected and that the attachment information generated from the second attachment is moved, and in response to determining that the movement of the attachment information generated from the second attachment is larger than a predefined value, deleting the attachment information generated from the second attachment and displaying the captured attachment uploading button again.

* * * * *